E. SCOTT.
ACETYLENE GAS GENERATOR.
APPLICATION FILED DEC. 19, 1911.
1,029,722.
Patented June 18, 1912.
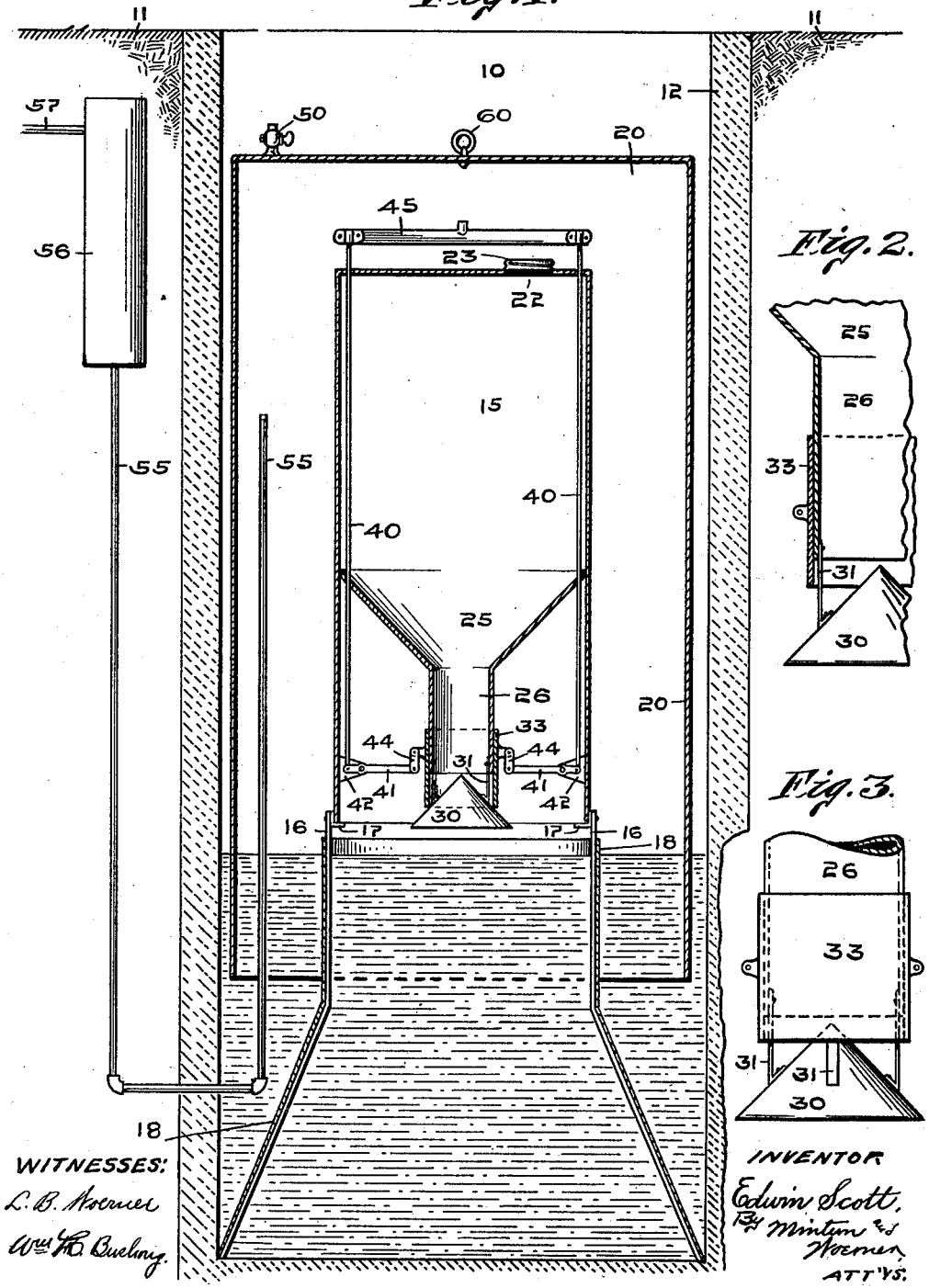
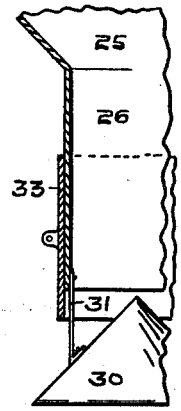
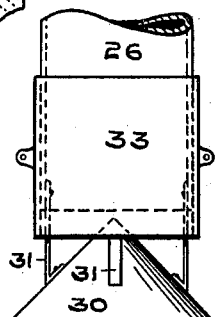

UNITED STATES PATENT OFFICE.

EDWIN SCOTT, OF NEWBERRY, INDIANA.

ACETYLENE-GAS GENERATOR.

1,029,722.  Specification of Letters Patent.  Patented June 18, 1912.

Application filed December 19, 1911. Serial No. 666,815.

*To all whom it may concern:*

Be it known that I, EDWIN SCOTT, a citizen of the United States, residing at Newberry, in the county of Green and State of Indiana, have invented certain new and useful Improvements in Acetylene-Gas Generators, of which the following is a specification.

This invention relates to an acetylene gas generator, belonging to that type wherein the lower end and inlet of the gas-holder is water sealed, and wherein the movement of the holder actuates the valve for supplying a new charge of carbid to the water, when the pressure within the holder has been reduced to a prescribed limit.

The object of the invention is to provide an acetylene gas generator which is simple in construction and efficient in operation, and so arranged as to insure safety to surrounding buildings to which the gas is supplied.

I accomplish the object of the invention by means of the construction shown in the accompanying drawings, made a part hereof, in which—

Figure 1 is a central vertical sectional view through the gas generator. Fig. 2 is an enlarged fragmentary detail sectional view of the discharge end of the carbid hopper and the valve for controlling the discharge opening therein. Fig. 3 is a fragmentary detail view in side elevation of the lower end of the hopper and the valve for controlling the discharge opening therein.

The gas generator herein shown may be located above the ground, but in order to insure safety to surrounding buildings in congested districts, and to prevent the water within the generator from freezing, I find it more convenient to place the same within a pit located in the ground.

10 represents the pit, 11 the surface of the ground, and 12 the wall of the pit which is usually and preferably composed of concrete. The carbid container consists of a receptacle or hopper 15 which is located centrally within the pit 10, and is mounted upon a frame-work, composed of a plurality, usually three or four, of flat-iron bars 16, and attached to the upper end of said bars are the angle-irons 17 which form a support for the carbid-receptacle 15. The bars 16 are bent outwardly and project and rest against the inner wall of the pit 10 as shown, and the bars 16 are inclosed by means of a skirt 18, and the chamber formed by said skirt receives the carbid discharged from the carbid-receptacle. The process of generating gas is confined within the area inclosed by the skirt 18 and through its formation the gas is directed to and discharged into the gas-holder 20.

The carbid-receptacle 15 is provided with an opening 22, covered by a screw-cap 23 through which the carbid is introduced, and the lower end of said receptacle is contracted, as at 25 and terminates in a sleeve 26 that forms the discharge opening. Suspended below and located concentrically with the discharge opening of the carbid-receptacle is a cone or spreader 30 adapted to separate and distribute the carbid, which cone is maintained in proper position with relation to said discharge opening by means of a plurality of braces 31. A collar 33 surrounds the sleeve 26 and has longitudinal movement on said sleeve. The collar 33 when occupying its lowest position rests upon the cone 30 whereby the discharge opening of the carbid-receptacle is closed, and when said collar is elevated the discharge opening of said receptacle is opened.

The movement of the collar 33 is effected by means of the gas-holder 20 operating through the vertical rods 40 arranged within and at opposite sides of the carbid-receptacle 15. These rods engage the levers 41 which are pivotally secured to the standards 42, the levers 41 engaging the collar 33 through suitable links 44. When sufficient gas has been withdrawn from the gas-holder 20 to allow the same to descend and contract upon the upper ends of the rods 40 the collar 33 will be elevated and allow a fresh charge of carbid to be discharged into the water in the pit, and when sufficient gas has been generated to elevate the gas-holder 20 to relieve the pressure from the rods 40, the collar 33 will descend to its lowest position and engage the surface of the cone 30 and stop the discharge of carbid from the carbid-receptacle 15. This downward movement of the collar 33 is effected by placing the fulcrums of the levers 41 in close proximity to the rods 40, so that the leverage afforded said collar is sufficient to elevate the rods 40 and the cross-bar 45. In order to impart uniform movement to both of the rods 40 they are tied together at the top by means of a cross-bar 45. The gas-holder 20 is provided with the valve 50 in its top which may be opened to allow the air to be removed therefrom. The gas is withdrawn from the holder 20 through the pipe 55 and into a purifier 56 which removes both the water and other extraneous matter from the gas before entering the service-pipe 57.

The gas-holder 20 may be entirely removed from the pit by means of a suitable windlass or block-and-tackle (not shown) located above the pit, the rope leading from the hoisting device engaging the eye 60 secured to the central portion of the gas-holder. After the gas-holder is removed the carbid-receptacle 15 may be removed by making suitable attachment with the cross-bar 45.

Having thus fully described my said invention, what I desire to secure by Letters Patent, is—

1. An acetylene gas generator comprising a water holding generating chamber, a carbid-receptacle located within and above the water in said chamber and provided with a discharge opening, a spreader located below and in line with said discharge opening, a hollow valve extending around said discharge opening in said carbid-receptacle, a vertically disposed rod arranged at each side of said valve and actuated by said gas-holder, and levers pivotally engaging the rods and with the opposite sides of said valve for exerting a uniform pull on said valve.

2. An acetylene gas generator comprising a water holding generating chamber, a carbid-receptacle located within and above the water in said chamber and provided with a discharge opening, a spreader located below and in line with said discharge opening, a hollow valve extending around said discharge opening in said carbid-receptacle, a vertically disposed rod arranged at each side of said valve and actuated by said gas-holder, and levers pivotally engaging the rods and with the opposite sides of said valve for exerting a uniform pull on said valve, an open bottom gas-holder inclosing said carbid-receptacle, and a skirt encompassing the entire area of the pit and extended up above the water and adapted to direct the gas into said gas-holder.

3. An acetylene gas generator comprising a water holding generating chamber, a carbid-receptacle located within and above the water in said chamber and provided with a discharge opening, a spreader located below and in line with said discharge opening, a hollow valve extending around said discharge opening in said carbid-receptacle, a vertically disposed rod arranged at each side of said valve and actuated by said gas-holder, levers pivotally engaging said rods, and links interposed and pivotally connecting the ends of the levers and valve to provide compensating adjustment between said levers and valve.

In witness whereof, I have hereunto set my hand and seal at Indianapolis, Indiana, this 7th day of December, A. D. one thousand nine hundred and eleven.

EDWIN SCOTT. [L. S.]

Witnesses:
F. W. WOERNER,
L. B. WOERNER.

---

Copies of this patent may be obtained for five cents each, by addressing the "Commissioner of Patents, Washington, D. C."